United States Patent
Jang et al.

(10) Patent No.: US 8,885,039 B2
(45) Date of Patent: Nov. 11, 2014

(54) PROVIDING VEHICLE INFORMATION

(75) Inventors: Junyoung Jang, Pyeongtaek-si (KR); Sangyong Park, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 1013 days.

(21) Appl. No.: 12/466,623

(22) Filed: May 15, 2009

(65) Prior Publication Data

US 2010/0020169 A1   Jan. 28, 2010

(30) Foreign Application Priority Data

Jul. 25, 2008  (KR) .................. 10-2008-0073030
Jul. 29, 2008  (KR) .................. 10-2008-0074056

(51) Int. Cl.
*H04N 7/00*   (2011.01)
*G01C 21/36*  (2006.01)

(52) U.S. Cl.
CPC ............ *G01C 21/36* (2013.01); *G01C 21/3697* (2013.01)
USPC ........... 348/115; 340/436; 340/901; 340/902; 340/903; 340/904; 340/905; 701/300; 701/301; 701/302

(58) Field of Classification Search
USPC .............. 348/113–119; 701/1, 300–302; 340/901–905, 933–943
See application file for complete search history.

(56) References Cited

U.S. PATENT DOCUMENTS

| | | | | |
|---|---|---|---|---|
| 5,369,590 A * | 11/1994 | Karasudani | .................. | 701/300 |
| 5,475,494 A * | 12/1995 | Nishida et al. | ................ | 356/4.01 |
| 6,356,206 B1 * | 3/2002 | Takenaga et al. | ............. | 340/903 |
| 6,720,920 B2 * | 4/2004 | Breed et al. | .................... | 342/386 |
| 6,741,168 B2 * | 5/2004 | Webb et al. | .................... | 340/436 |
| 6,791,471 B2 * | 9/2004 | Wehner et al. | ................ | 340/903 |
| 7,272,357 B2 * | 9/2007 | Nishiga et al. | ............... | 455/11.1 |
| 7,382,274 B1 * | 6/2008 | Kermani et al. | ............. | 340/901 |
| 7,720,026 B2 * | 5/2010 | Chen et al. | .................... | 370/328 |
| 7,873,474 B2 * | 1/2011 | Yamamoto et al. | ........... | 701/301 |
| 2004/0073367 A1 * | 4/2004 | Altan et al. | .................... | 701/301 |
| 2004/0116106 A1 * | 6/2004 | Shishido et al. | ........... | 455/414.2 |
| 2004/0199327 A1 * | 10/2004 | Isogai et al. | .................. | 701/301 |
| 2005/0003844 A1 * | 1/2005 | Nishiga et al. | ................ | 455/517 |
| 2005/0075782 A1 * | 4/2005 | Torgunrud | .................... | 701/117 |
| 2006/0031003 A1 * | 2/2006 | Sun et al. | ...................... | 701/117 |
| 2006/0176847 A1 * | 8/2006 | Chen et al. | .................... | 370/328 |
| 2006/0224301 A1 * | 10/2006 | Sakagami et al. | ........... | 701/200 |
| 2007/0016372 A1 * | 1/2007 | Browne et al. | ................ | 701/213 |
| 2007/0124063 A1 * | 5/2007 | Kindo | ........................... | 701/208 |
| 2007/0282532 A1 * | 12/2007 | Yamamoto et al. | .......... | 701/301 |
| 2009/0167513 A1 * | 7/2009 | Hill et al. | ...................... | 340/435 |

FOREIGN PATENT DOCUMENTS

| | | |
|---|---|---|
| JP | 10-250508 A | 9/1998 |
| JP | 2000-238594 A | 9/2000 |
| JP | 2005-115484 A | 4/2005 |

(Continued)

*Primary Examiner* — Thomas Dailey
(74) *Attorney, Agent, or Firm* — Birch, Stewart, Kolasch & Birch, LLP

(57) ABSTRACT

A vehicle navigation apparatus including a transceiver configured to communicate with at least one other vehicle near a vehicle including the vehicle navigation apparatus and configured to receive traveling information about the at least one other vehicle, a controller configured to calculate first movement information of the vehicle and second movement information of the at least one other vehicle based on the received traveling information, and a display unit configured to display a graphical representation of the vehicle and the at least one other vehicle based on the calculated movement information.

16 Claims, 10 Drawing Sheets

(56) References Cited

FOREIGN PATENT DOCUMENTS

| JP | 2008-70998 | A | 3/2008 |
| KR | 10-2005-0098210 | A | 10/2005 |
| KR | 10-0820310 | B1 | 4/2008 |

\* cited by examiner

PROVIDING VEHICLE INFORMATION

CROSS-REFERENCE TO RELATED APPLICATIONS

This non-provisional application claims priority under 35 U.S.C. §119(a) to Korean Patent Application Nos. 10-2008-0073030 and 10-2008-0074056 filed in the Republic of Korea on Jul. 25, 2008 and Jul. 29, 2008, respectively, the entire contents of which are hereby incorporated by reference.

BACKGROUND OF THE INVENTION

1. Field of the Invention

The present application relates to a method and apparatus for providing vehicle information.

2. Description of the Related Art

A navigation system provides a user or driver with navigation information including road information between a starting point and a destination and provides optimal routes for various moving objects such as vehicles, etc. In more detail, a navigation system receives navigation messages transmitted from global positioning system (GPS) satellites, detects a driving status of a vehicle using a gyroscope and sensors such as a speed sensor, determines a current position of the vehicle being driven through a dead-reckoning process employing the navigation messages received through the GPS module and the traveling status detection signal of the vehicle, and displays the determined current position of the vehicle on a screen of a display unit along with a map by matching the current position to map data.

Accordingly, the navigation system enables a driver of the vehicle to confirm the current position of the vehicle and the shortest route from the current position to the destination, and also to plan a route along which the vehicle will be driven. However, the related art navigation system provides only limited information to the user.

SUMMARY OF THE INVENTION

Accordingly, an object of the present invention is to address the above-noted and other problems.

Another object of the present invention is to provide a novel method and apparatus for providing information that allows drivers to safely drive their vehicles.

To achieve these and other advantages and in accordance with the purpose of the present invention, as embodied and broadly described herein, the present invention provides in one aspect a vehicle navigation apparatus including a A vehicle navigation apparatus including a transceiver configured to communicate with at least one other vehicle near a vehicle including the vehicle navigation apparatus and configured to receive traveling information about the at least one other vehicle, a controller configured to calculate first movement information of the vehicle and second movement information of the at least one other vehicle based on the received traveling information, and a display unit configured to display a graphical representation of the vehicle and the at least one other vehicle based on the calculated movement information. The present invention also provides a corresponding method of controlling a vehicle navigation apparatus.

In another aspect, the present invention provides a navigation apparatus including at least one camera mounted in a vehicle and configured to capture image information of other vehicles near the vehicle, and a heads up display (HUD) unit configured to display at least portions of the image information of the other vehicles in two or more areas on the display unit, which are divided according to directions of the other vehicles, so that the at least portions of the of image information are distinguished from each other. The present invention also provides a corresponding method of controlling a vehicle navigation apparatus.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
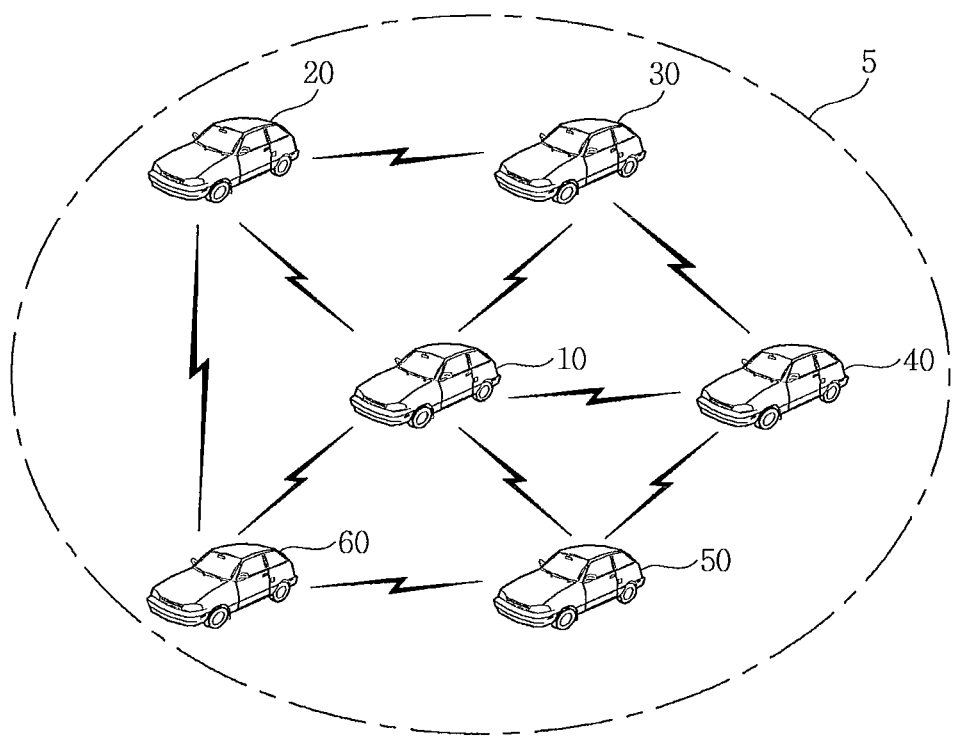
FIGS. 1 and 2 are diagrams illustrating examples of a wireless mesh network established to provide vehicle information according to an embodiment of the present application.

FIG. 1 is a diagram illustrating an example of a wireless mesh network 5 including a plurality of vehicles 10 to 60 that share each others vehicle traveling information according to an embodiment of the present invention. In addition, wireless standards for providing the vehicle information can be the standards of the wireless mesh network called the Task Group S (TGs) of the IEEE 802.11 Working Group (802.11WG). This particular wireless mesh network can be used to enable multi-hop and multi-link methods, and thus can be used to select several communication paths. Accordingly, the wireless mesh network can increase the reliability of data transmission.

Thus, according to an embodiment of the present invention, the corresponding vehicles 10 to 60 can perform wireless communication with neighboring wireless communication terminals mounted in other vehicles through the wireless communication terminals using the peer-to-peer method and can also communicate with other wireless communication terminals, which are located outside a direct communication range, through the wireless communication terminals using the multi-hop method.

A method of collecting traveling information of surrounding vehicles will now be described for the vehicle 10. In more detail, the vehicles 10 to 60 included in the wireless mesh network periodically exchange and update their traveling information through communication paths. Further, the range of surrounding vehicles in which the vehicle 10 receives, stores, and updates traveling information through this wireless mesh network can be limited to, for example, within a specific radius from a current position of the vehicle 10 on a road or a specific number of vehicles in a sequence of vehicles adjacent to the vehicle 10. The criterion for defining surrounding vehicles may also be changed by a user.

Further, the range of surrounding vehicles of the vehicle 10 can be changed as vehicles are driven. For example, a vehicle can move out of the range of the surrounding vehicles or a new vehicle can move into to the range of the surrounding vehicles. The criterion for the range of surrounding vehicles may also be changed according to the speed of the vehicle 10 or may be changed by a user. In addition, the vehicles 10 to 60 correspond to all carriers such as general passenger cars, buses, and trains. However, for convenience of explanation, the following embodiments refer to the vehicles as general passenger cars. Thus, the vehicle 10 (e.g., a passenger car) is equipped with a terminal enabling communication with other terminals mounted in other vehicles in the wireless mesh network 5. Therefore, the vehicle 10 can receive traveling information of surrounding vehicles, analyze the received data and deliver the analyzed data to a user via graphics, text and/or an audio signal.

Figure 2:
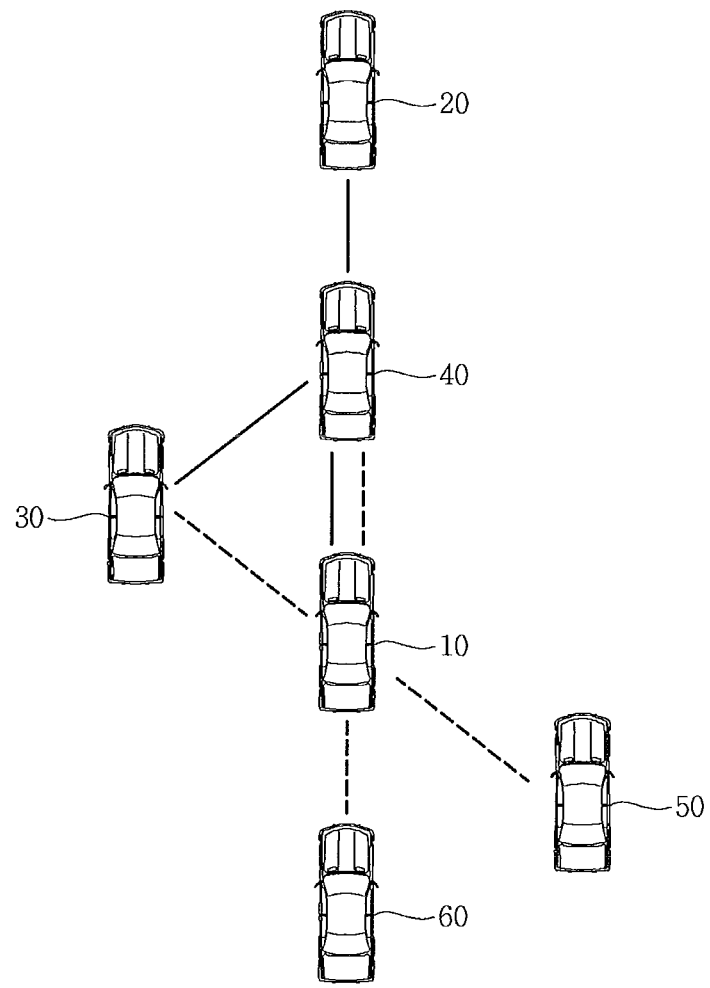

Next, FIG. 2 is a diagram illustrating an example of a wireless mesh network established between vehicles on the road. Referring to FIG. 2, the vehicle 10 directly accesses surrounding vehicles 30, 40, 50, and 60 and receives a latitude, longitude, altitude and speed information about the vehicles. Similarly, the vehicle 40 directly accesses surrounding vehicles 10, 20 and 30, and receives position and speed information about the vehicles. Accordingly, the vehicle 10 can receive position and speed information of the vehicle 20, which does not directly access the vehicle 10, through communication with the vehicle 40.

Figure 3:
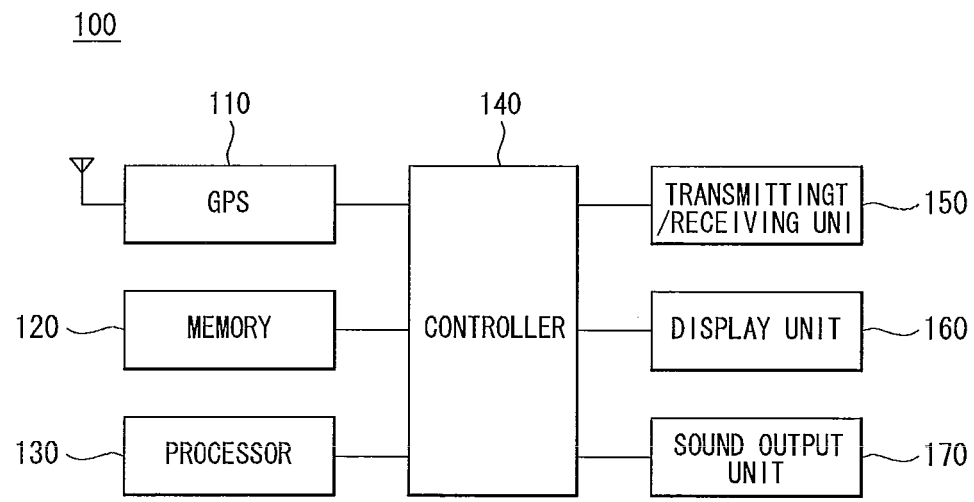
FIG. 3 is a block diagram illustrating a terminal according to an embodiment of the present invention.

Next, FIG. 3 is a block diagram illustrating a terminal 100 according to an embodiment of the present invention. In addition, the terminal 100 corresponds to, for example, a variety of portable terminals, which can operate in conjunction with a GPS module that receives navigation messages received from GPS satellites and is equipped with a display that can display graphic information. The portable terminals may be mounted in vehicles or located within the vehicles. The vehicle 10 in which the terminal 100 is mounted is hereinafter referred to as 'my vehicle'.

Referring to FIG. 3, the terminal 100 includes a GPS module 110, a memory 120, a processor 130, a controller 140, a transmitter/receiver 150, a display unit 160, and a sound output unit 170. Further, the GPS module 110 receives navigation messages transmitted from GPS satellites through an antenna and provides the received messages to the controller 140. Accordingly, the terminal 100 can provide a navigation function based on the navigation messages and perform a variety of functions using the navigation messages, such as collection of traveling information about the vehicle 10 in which the terminal 100 is mounted. Also, the GPS module 110 may be included in the terminal 100, as in the present example, or may be mounted in a car as a separate device and perform functions through connection to the terminal 100.

In addition, the memory 120 stores programs and data used to perform various functions provided by the terminal 100, and a variety of data occurring when the terminal 100 operates. Further, the memory 120 stores traveling information of my vehicle 10, which is transmitted and received through the transmitter/receiver 150, and traveling information of surrounding vehicles 20 to 60. The memory 120 also stores a variety of data used for operations, such as analysis of traveling information and a danger prediction program by the processor 130, and various pieces of information such as sound files for graphic data and sound output used to display traveling information of surrounding vehicles received by the controller 140 on the display unit 160.

The memory 120 can also store map data to assist the driver in driving the vehicle 10 based on the navigation messages received from the GPS satellites. The map data can include not only basic data such as road vertexes including crossings with other roads, a link distance between links connecting respective vertexes, and other various geographical data including geographical information or graphic data. When the terminal 100 does not store map data in an electronic map format due to a limited memory capacity, for example, a variety of geographical data may be stored in the memory 120 in text form.

In addition, the processor 130 calculates a distance between my vehicle 10 and other vehicles 20 to 60 and a speed change of the vehicles by analyzing traveling information of the vehicles 10 to 60 such as a position and a speed, obtains movement or flow information of surrounding vehicles through route tracking, and predicts the degree of danger using a danger prediction program for analyzing movement patterns of surrounding vehicles. The movement or flow information includes all pieces of information such as collected traveling information including the position and speed of the vehicles 10 to 60, an analyzed distance between my vehicle 10 and surrounding vehicles, a speed change, a traveling route and a driving prediction route, etc.

An example of the danger prediction program includes notifying a driver when a speed change of other vehicles 20 to 60 is greater than a reference value based on a distance between my vehicle 10 and the other vehicles 20 to 60 or when a value between a route predicted according to a transition of a position and a speed change of other vehicles 20 to 60 and a predicted route of my vehicle 10 approaches a reference value or higher. That is, the danger prediction program can determine that the degree of danger is high and appropriately notify the driver.

Further, the controller 140 controls an overall operation of the components of the terminal 100. In particular, the controller 140 controls traveling information of surrounding vehicles to be stored in the memory 120 by transmitting or receiving the traveling information through the transmitter/receiver 150, performs a graphical process on movement information of surrounding vehicles received from the processor 130, and displays the processing results on the display unit 160. Also, when the processor 130 executes the danger prediction program and the program determines that the degree of danger is greater or equal to a reference value, the controller 140 can output a warning of a danger through the display unit 160 and/or the sound output unit 170. The controller 140 can also provide information to the driver to help him or her avoid a detected danger such as requesting the speed of the vehicle be lowered to a certain value, requesting a traffic lane change to a safer one of the left and right lanes, etc.

In addition, the processor 130 and the controller 140 can be implemented as separate components, but may be implemented into a single component such as a central processing unit (CPU) having a sufficient information processing capacity. Further, the controller 140 converts movement or flow information of surrounding vehicles that are received through the processor 130 into image information by employing text and graphic information stored in the memory 120 and controls the converted image information to be displayed on the display unit 160. The controller 140 may also retrieve corresponding sound source files stored in the memory 120 and control the sound output unit 170 to output an audio signal.

In addition, the transmitter/receiver 150 collects traveling information of my vehicle 10 and surrounding vehicles 20 to 60 by transmitting or receiving the traveling information through communication with surrounding vehicles 20 to 60 directly or using the multi-hop method under the control of the controller 140. The transmitter/receiver 150 also includes a communication module for establishing a mesh network with the surrounding vehicles 20 to 60. Further, the controller 140 controls the transmitter/receiver 150 to transmit or receive traveling information of my vehicle 10 and traveling information of surrounding vehicles 20 to 60 through communications between my vehicle 10 and the surrounding vehicles 20 to 60. The controller 140 may also control the transmission and reception of such traveling information to be performed, for example, in a cycle of 100 ms or less so that the traveling information can be updated within a short cycle time.

In addition, the display unit 160 can be implemented using a display device such as a liquid crystal display (LCD) and can display video signals input from the controller 140. The display unit 160 may also be implemented using a touch screen so that the display unit 160 can both display information and also act as an input unit. That is, the user can select or input functions on the display unit 160 by touching menus, etc. on the touch screen a using a finger, a stylus pen or the like. Further, the sound output unit 170 receives a sound source file from the memory 120 and generates a preset audio signal for providing an alarm or voice guidance under the control of the controller 140, when a dangerous situation occurs or guidance is needed depending on movement or flow information of surrounding vehicles. Also, when a navigation function is performed, the sound output unit 170 can generate a preset audio signal for voice guidance about a selected route, amplify the generated signal to a specific level or higher, and output the amplified signal through one or more speakers.

In addition, the terminal 100 may include an input unit for receiving various operation commands from a user and applying the commands to the controller 140. The controller 140 also controls the GPS module 110 to interpret a received navigation message, collects various pieces of information such as a current position, a starting point, and a destination of my vehicle 10, and traveling information such as the speed, speed change, and traffic lane change of my vehicle 10 based on the interpreted navigation message, stores the collected information in the memory 120, and transmits the stored information to a server 410 (see FIG. 9) through the transmitter/receiver 150. The controller 140 can also collect such traveling information as the position and speed of my vehicle 10 by integrally interpreting information input through a gyroscope and various sensors such as a speed sensor installed in my vehicle 10, and a navigation message received by the GPS module 110.

Figure 4:
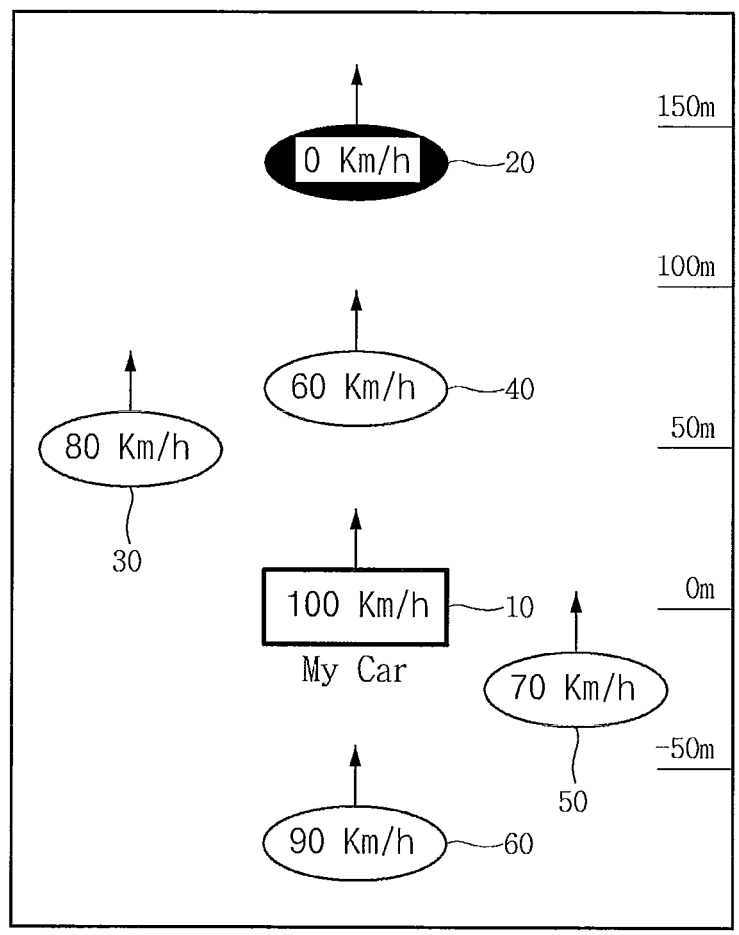
FIG. 4 is an example of a display screen including vehicle information according to an embodiment of the present invention.

Next, FIG. 4 is an overview of a display screen illustrating movement information of surrounding vehicles being displayed on the display unit 160. In more detail, the controller 140 searches map data for data about a road type such as a straight road, a curved road, an access road, and a crossing, performs a graphical process on a searched road type, displays the processing result on the display unit 160, represents surrounding vehicles 20 to 60 as graphic elements such as figures based on my vehicle 10, and displays the represented vehicles at positions corresponding to respective road types. The controller 140 also changes a relative distance and position between my vehicle 10 and the respective vehicles 20 to 60 according to a position change of the respective vehicles 20 to 60 with reference to movement information of the respective vehicles 20 to 60 and displays a changed position on a road type of the display unit 160. Accordingly, the controller 140 can control the display unit 160 to display the movement of surrounding vehicles 20 to 60 in correspondence with a relative movement between my vehicle 10 and the surrounding vehicles 20 to 60.

Further, the display unit 160 can display my vehicle 10 using a different graphic element, color, etc. from that of surrounding vehicles 20 to 60, and display the speeds of corresponding vehicles 10 to 60 within respective graphic elements. In addition, the graphic elements can be displayed as 2D figures, various graphic elements such as a real 2D or 3D picture, etc. Also, text indicative of relative distances from the position of my vehicle 10 can be displayed on the right side of the screen. Although the position of my vehicle 10 may be changed, the position can be fixed to and displayed at a specific position on the screen. Further, the positions of surrounding vehicles 20 to 60 can be changed or a car that newly joins surrounding vehicles can be generated and displayed.

As shown in FIG. 4, the display unit 160 displays information such as the vehicle 10 and surrounding vehicles 20, 30, 40, 50 and 60. The speed information for each vehicle is also displayed. The relative positions of the displayed graphical elements representing the different vehicles can also be displayed on the display unit 160 to correspond with the actual relative positions of the vehicles. Thus, as shown in FIG. 4, the controller 140 in my vehicle 10 analyzed traveling information of the vehicle 20 received through the vehicle 40 and has determined that the speed of the vehicle 20 suddenly decreased to 0 mph. Accordingly, the processor 130 of my vehicle 10 executes the danger prediction program due to the sudden reduction in the speed of the vehicle 20 and that the my vehicle 10 is being driven at 65 mph on the same traffic lane as that of the vehicle 20 and then performs route prediction.

As a result of the prediction, for example, after six (6) seconds elapse from the current time, a distance between the vehicle 20 and a subsequent vehicle 40 will approach or exceed a reference value, so that collision between the vehicle 20 and the vehicle 40 can be predicted. Accordingly, the processor 130 inputs danger information including the dangerous situation for the vehicle 20 (i.e., a factor that has caused the dangerous situation) to the controller 140. The controller 140 then outputs the danger information through the display unit 160 and the sound output unit 170 to inform a driver of the danger information.

Further, as shown in FIG. 4, the danger of a rear-end collision can be warned by changing the color, size, etc. of the vehicle 20. That is, the user can be warned about a dangerous factor or a danger by emphasizing or distinctively displaying the graphic element of the vehicle 20. For example, the color of the graphic element of the vehicle 20 can be turned red and flash on and off, etc. At the same time, guidance voice information or and alarm such as a voice saying "Danger! There is a suddenly stopped vehicle 300 feet ahead", may be output through the sound output unit 170. In addition, the memory 120 can buffer and update a screen on which movement information of vehicles is displayed, for example, with an amount of 5 minutes so that the screen can be utilized as base data for analyzing the cause of an accident when an accident occurs.

Figure 5:
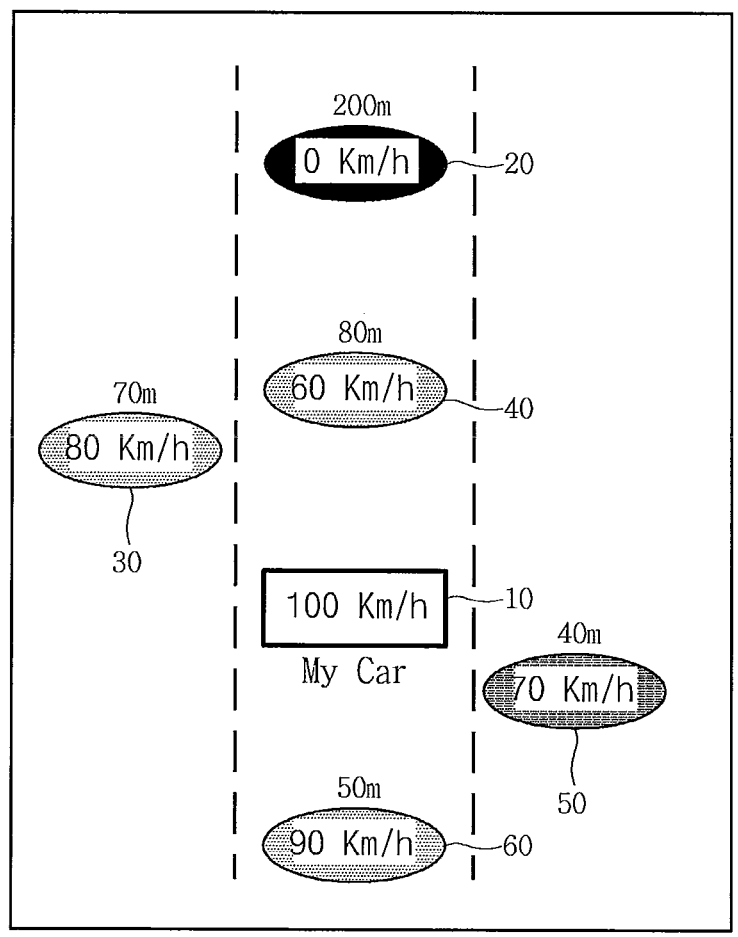
FIG. 5 is another example of a display screen including vehicle information according to an embodiment of the present invention.

Next, FIG. 5 is an overview of a displaying screen illustrating another example of displaying movement information of vehicles on the display unit 160. In this example, the controller 140 displays the speeds of the respective vehicles 10 to 60 within the graphic elements corresponding to the different vehicles and displays the distances between my vehicle 10 and the respective vehicles 20 to 60 outside the graphic elements. Further, the controller 140 determines whether or not there is a traffic lane and sets a direction by analyzing a road type and movement information such as a position and route of each vehicle, and displays the information on the screen of the display unit 160, thus significantly improving the identity of a driver.

In addition, the controller 140 can display neighboring vehicles preferentially by changing the number of vehicles displayed according to the speed of my vehicle 10 or can display only surrounding vehicles within a radius where vehicles are displayed on the screen by changing the corresponding radius according to the speed of my vehicle 10. For example, the number of vehicles displayed when the speed of my vehicle 10 increases 10 mph can be increased every five or a distance from my vehicle 10 can be displayed up to 450 feet instead of 300 feet.

That is, when a radius is displayed on the screen, a criterion for setting the radius can be adjusted based on a change in the braking distance according to the speed. Accordingly, all vehicles within a radius set based on my vehicle 10 can be displayed. Further, when the number of vehicles displayed is variably set, vehicles existing near my vehicle 10 can be displayed as many as the number that is previously set or set by a user, and the number of vehicles displayed can be easily changed by a user through an input unit.

In addition, even when surrounding vehicles are displayed within a radius of my vehicle 10, a criterion for the radius can be easily changed by a user through an input unit. Accordingly, the controller 140 searches the memory 120 for traveling information of surrounding vehicles based on the speed of my vehicle 10, a previously set radius, and the number of vehicles previously set while operating in conjunction with the processor 130, and, if appropriate, controls the transmitter/receiver 150 to collect traveling information of surrounding vehicles, which should be displayed on the screen, over a mesh network.

Further, the controller 140 predicts routes of surrounding vehicles through the danger prediction program of the processor 130. Also, if, for example, a direction is changed according to traveling information of my vehicle 10, the controller 140 collects traveling information about vehicles placed in the corresponding direction over a mesh network. The processor 130 also calculates movement information of the vehicles by analyzing the collected traveling information. The controller 140 then displays the calculated movement information about the corresponding vehicles on the screen.

Such collection and update of traveling information about surrounding vehicles by the controller 140 are preferably performed within a cycle as short as possible, for example, 100 ms. The processor 130 also analyzes movement patterns of surrounding vehicles based on traveling information of the surrounding vehicles, which is updated periodically, and predicts the degree of danger of the surrounding vehicles and determines dangerous vehicles by sensing passing vehicles, suddenly stopped vehicles, cut-in vehicles, dozing-off vehicles, traffic sign-violation vehicles, and so on.

Accordingly, a vehicle having the degree of danger higher than a reference value can be classified as a dangerous car and displayed as, for example, a red graphic element. Further, a safe car that is determined not to have the degree of danger can be displayed as a green graphic element, and a car having the degree of danger lower than a reference value, but not being classified as a safe car can be displayed as an orange or yellow graphic element.

Figure 6:
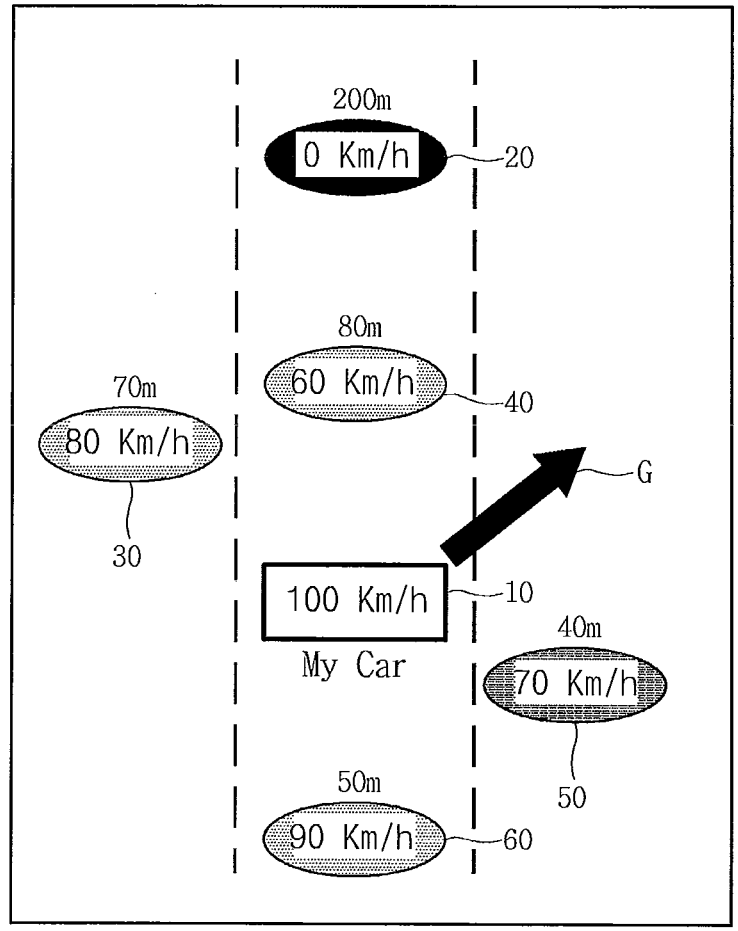
FIG. 6 is still another example of a display screen including vehicle information according to an embodiment of the present invention.

Next, FIG. 6 is an overview of a display screen illustrating still another example of displaying movement information of vehicles on the display unit 160. FIG. 6 is similar to FIGS. 4 and 5, but displays information for avoiding a danger according to the determination of the degree of danger. For example, when the controller 140 analyzes traveling information of the vehicle 20 received through the vehicle 40 by my vehicle 10, and determines the speed of the vehicle 20 suddenly decreased to 0 mph and therefore a dangerous situation has occurred through the danger prediction program, the processor 130 can calculate adequate danger avoidance information to avoid the dangerous situation with the vehicle 20, i.e., a factor that has caused the dangerous situation by tracking routes of respective vehicles.

The processor 130 can also analyze a variety of preset danger avoidance scenarios, such as reduction of speed, a change of a traffic lane, acceleration and then a change of a traffic lane, and a direction of a traffic lane change based on a current dangerous situation and movement information of dangerous factors using the danger prediction program, and calculate a danger avoidance scenario indicating, for example, a danger factor with the lowest degree of danger and a predicted route having the farthest distance from predicted routes of surrounding vehicles as danger avoidance information.

Accordingly, the controller 140 displays the danger avoidance information on the display unit 160, and if appropriate may provide the information through the sound output unit 170. Also, as shown in FIG. 6, when the controller 140 determines that a traffic lane change to a right traffic lane has the lowest degree of danger as a result of analyzing a danger avoidance scenario of the processor 130 through a danger prediction program, the controller 140 can display the traffic lane change to the right traffic lane on the display unit 160 as, for example, an arrow G and provide danger avoidance information through voice using the sound output unit 170.

Figure 7A:
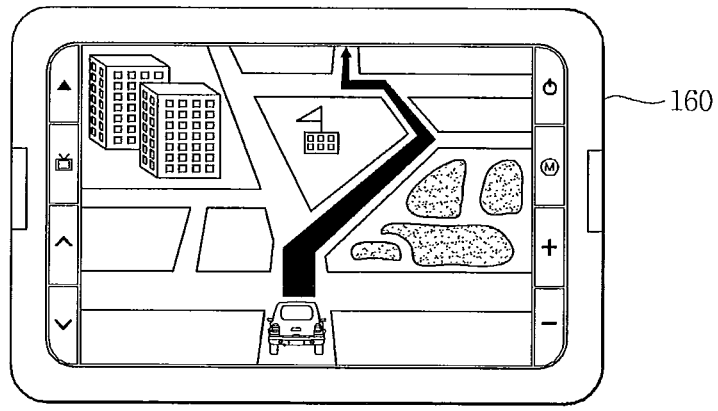
FIGS. 7A to 7C are overviews of display screens illustrating a change in a mode of a vehicle information screen according to an embodiment of the present invention.
Figure 7B:
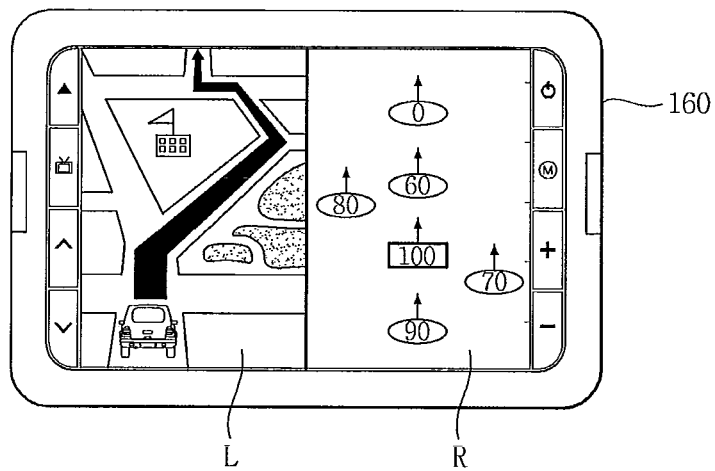
Figure 7C:
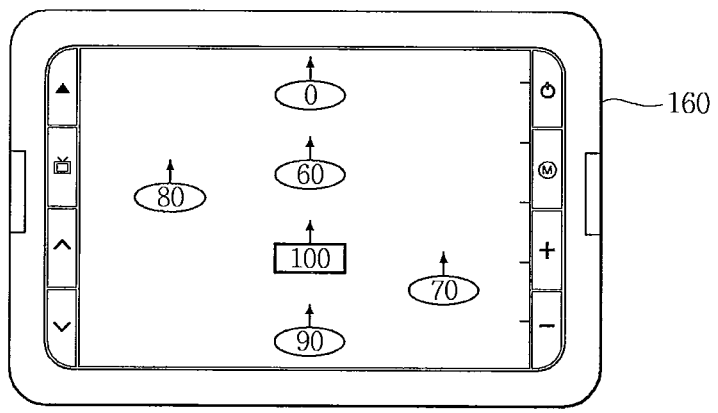

Next, FIGS. 7A to 7C are overviews of display screens of the display unit 160. In more detail, when the terminal 100 performs a navigation function, the display unit 160 can display the screen shown in FIG. 7A, for example. Also, when a user wants to check movement information of surrounding vehicles, the display screen can be split into a dual mode, i.e., a navigation screen and a screen displaying movement information of the surrounding vehicles as shown in FIG. 7B. Further, rather than splitting the screens as shown in FIG. 7B, the display unit 160 can display only a screen displaying movement information of surrounding vehicles as shown in FIG. 7C. A user can then toggle between the display screen shown in FIGS. 7A and 7C by selecting an appropriate toggle button, by touching a predetermined portion of the screen (e.g., a center portion), by performing a predetermined touching operation (e.g., using a double touch operation), using a voice instruction, etc.

Figure 8:
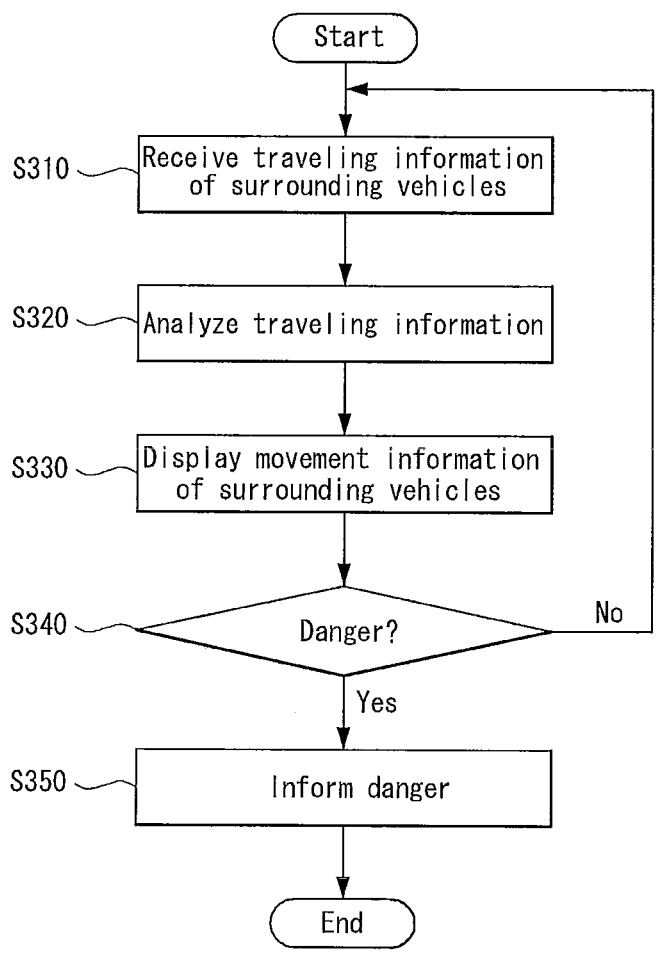
FIG. 8 is a flowchart illustrating a method of displaying vehicle information according to an embodiment of the present invention.

Next, FIG. 8 is a flowchart illustrating a method of providing vehicle information according to an embodiment of the present invention. As shown in FIG. 8, the controller 140 receives traveling information about my vehicle 10 from the GPS module 110 and sensors mounted in my vehicle 10, and also receives traveling information about surrounding vehicles through the transmitter/receiver 150 (S310). The processor 130 then calculates movement information about the surrounding vehicles by analyzing the traveling information of my vehicle 10 and the surrounding vehicles and executes a danger prediction program (S320). The processor 130 can also provide danger avoidance information through the danger prediction program, if appropriate. In addition, the controller 140 represents the movement information of my vehicle and the surrounding vehicles as graphic elements and displays the graphic elements on the display unit 160 (S330).

Next, the controller 140 determines whether a dangerous situation has occurred according to the danger prediction program of the processor 130 (S340). If a dangerous situation has occurred (Yes in S340), the controller 140 checks a dangerous factor that has caused the dangerous situation and displays the checked dangerous factor on the display unit 160 and/or outputs an audio signal through the sound output unit 170 so as to inform the user about the danger (S350). Further, the controller 140 can control the processor 130 to select a scenario having the lowest degree of danger from a plurality of preset danger avoidance scenarios through the danger prediction program so as to provide a user with the determined scenario as danger avoidance information.

As described above, in accordance with one embodiment of the present invention, the driver of a vehicle can be provided with information to safely drive their vehicle such as movement information about surrounding vehicles. In particular, when there is a high possibility of an accident or accidents such as when the user's field of vision is poor, accidental situations can be effectively avoided by providing movement information about surrounding vehicles. Accordingly, the driver can more safely drive their vehicle. Further, the process that occurs when an accident is generated can be recorded based on movement information of vehicles. Accordingly, the cause of an accident can be easily determined.

Figure 9:
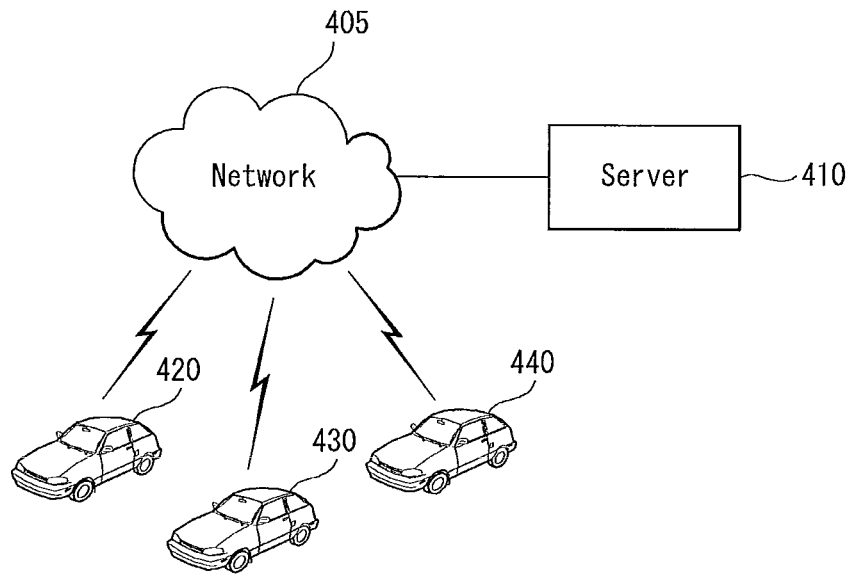
FIG. 9 is a diagram illustrating a traveling information providing system according to an embodiment of the present invention.

Next, FIG. 9 is a diagram illustrating a system for providing traveling information of surrounding vehicles according to an embodiment of the present invention. As shown, the system includes a server 410, and vehicles 420, 430 and 440. Further, the vehicles 420, 430 and 440 are connected to the server 410 over a network 405 that includes a variety of wireless communication networks, for example, a wireless Internet such as a wide area network (WAN) and wireless broadband Internet (WiBro), and mobile telecommunication networks such as code division multiple access (CDMA) and global system for mobile telecommunication (GSM) networks.

In addition, the server 410 collects traveling information of the vehicles 420, 430 and 440 by communicating with the vehicles 420, 430 and 440 over the network 405 and stores the collected information. If a specific vehicle 420 requests traveling information of other vehicles, the server 410 provides the requested traveling information of the vehicles 430 and 440 near the specific vehicle 420 to the specific vehicle 420. Also, the traveling information can include various pieces of information pertinent to the driving of vehicles, for example, destinations, scheduled traveling routes toward the destinations, current positions, speeds, speed changes, traveling directions, changes of traveling directions, etc. of the vehicles 420, 430 and 440.

The server 410 also receives traveling information from the vehicles 420, 430 and 440 and updates the traveling information of the vehicles 420, 430 and 440 periodically, for example, in a cycle of 100 ms or less. If a terminal mounted in a specific vehicle 420 requests traveling information about surrounding vehicles, the server 410 transmits the requested information to the terminal mounted in the specific vehicle 420 over a communication network such as the Internet, CDMA or GSM. In more detail, the server 410 receives a current position of the vehicle 420 for communication with the vehicle 420 that has requested the traveling information and transmits traveling information of other vehicles that are driven within a radius, for example, 100 m of the current position of the vehicle 420 on a road to the vehicle 420. In an alternative example, the server 410 can receive identifiers, for example, license numbers of surrounding vehicles from the vehicle 420 that has requested traveling information about the surrounding vehicles and selectively transmit traveling information of corresponding vehicles to the vehicle 420.

In addition, when the server 410 determines and defines surrounding vehicles and searches and transmits traveling information of defined surrounding vehicles, the range of surrounding vehicles of the vehicle 420 can be changed. Surrounding vehicles may be limited to, for example, vehicles that are driven on the right-rear, left-rear and rear sides of the vehicle 420 or vehicles that newly enter the positions. Also, the criterion for defining surrounding vehicles may be changed according to the speed of the vehicle 420 or a user's setting. Further, the vehicles 420, 430 and 440 correspond to all types of carriers such as general passenger cars, buses, and trains, etc. As discussed previously, the present specification refers to the terminals being mounted in general passenger cars. The terminals also can communicate with the server 410 over the network 405. Thus, the vehicle 420 is equipped with a terminal capable of communicating with the server 410, and can receive traveling information of surrounding vehicles from the server 410, process the received data and deliver the processed data to a user through graphics, text and/or audios, using the terminal mounted therein.

Figure 10:
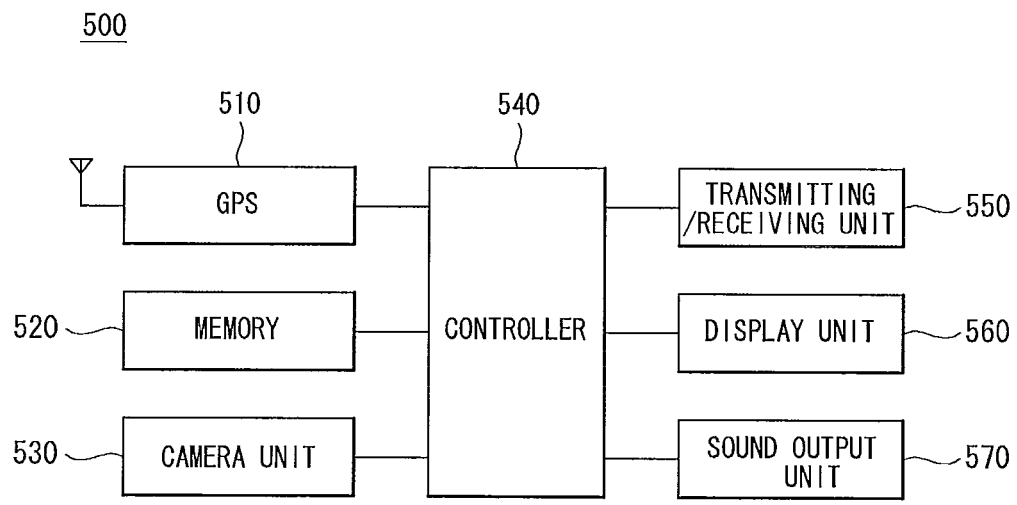
FIG. 10 is a block diagram illustrating a terminal according to an embodiment of the present invention.

Next, FIG. 10 is a block diagram illustrating a terminal 500 according to an embodiment of the present invention. The terminal 500 also corresponds to a variety of portable terminals that can operate in conjunction with a GPS module that receives navigation messages received from GPS satellites and is equipped with a display that can display graphic information. The portable terminals may be mounted in vehicles or located within the vehicles. Further, a vehicle in which the terminal 500 is mounted is hereinafter referred to as 'my vehicle'.

Referring to FIG. 10, the terminal 500 includes a GPS module 510, a memory 520, a camera unit 530, a controller 540, a transmitter/receiver unit 550, a display unit 560 and a sound output unit 570. The GPS module 510 receives navigation messages, transmitted from GPS satellites through an antenna and provides the received messages to the controller 540. Accordingly, the terminal 500 can provide a navigation function based on the navigation messages or execute a variety of functions using the navigation messages such as the collection of traveling information about the vehicle 420 in which the terminal 500 is mounted.

In addition, the GPS module 510 may be included in the terminal, as in the present example, but may be mounted in a vehicle as a separate device and perform functions through connection to the terminal 500. Further, the memory 520 stores programs and data used to execute various functions provided by the terminal 500, and a variety of data occurring when the terminal 500 operates. The memory 520 also stores various pieces of information such as sound files for graphic data and sound output that are used to display traveling information of surrounding vehicles received by the controller 540 on the display unit 560.

Further, the memory 520 can also store map data used to drive the vehicle 420 based on navigation messages received from the GPS satellites. The map data can include not only basic data such as road vertexes including crossings with other roads, and a link distance between links connecting respective vertexes, but also various geographical data including geographical information or graphic data. In addition, if the terminal 500 does not store map data in an electronic map format due to a limited memory capacity, a variety of geographical data may be stored in the memory 520 in text form. In addition, the camera unit 530 captures images of surrounding vehicles, which are driven on the left-rear and right-rear sides of the vehicle 420. To this end, the camera unit 530 can include a variety of image sensors such as a CCD sensor.

The camera unit 530 can also include two or more cameras for photographing the lateral and rear sides of a vehicle and can be attached to the vehicle. Images captured by the camera unit 530 are then processed by the controller 540 and displayed on the display unit 560. Further, the controller 540 controls an overall operation of each component of the terminal 500. The controller 540 also functions as a processor and processes image information input through the camera unit 530 and traveling information of surrounding vehicles, which is input to the terminal 500 through the transmitter/receiver unit 550, and outputs the processing result to the display unit 560 or the sound output unit 570.

Also, the controller 540 can serve as a processor, and also process a variety of data input to the terminal 500 using a processor separate from the controller 540. In addition, the transmitter/receiver unit 550 is a module for communicating with the server 410 through an antenna under the control of the controller 540. In the present embodiment, the transmitter/receiver unit 550 can include a module for performing communication using at least one of various wireless communication schemes, comprising CDMA, GSM, and wireless Internet.

Further, the display unit 560 can be implemented using a heads-up display (HUD). In one embodiment, the HUD includes a display method in which images are projected into a space in front the driver's vision. In another embodiment, the HUD includes a display device such as an LCD that is placed in front of the driver's vision. In this instance, the display unit 560 may be implemented using a touch screen so that it can perform both the display function and the entry function for displaying various functions provided by the terminal 500 in a menu form and executing a menu selected by a touch using a finger, a stylus pen or the like.

In addition, the sound output unit 570 receives a sound source file from the memory 520 and generates a preset audio signal for alarm or voice guidance under the control of the controller 540, when a dangerous situation occurs or guidance is needed depending on driving movement. Further, when a navigation function is performed, the sound output unit 570 can generate a preset audio signal for voice guidance about a selected route, amplify the generated signal to a specific level or higher, and output the amplified signal through one or more speakers.

In addition, the terminal 500 may include an input unit for receiving various operation commands from a user and applying the commands to the controller 540. The controller 540 can also transmit traveling information such as a current position of my vehicle to the server 410 by communicating with the server 410 through the transmitter/receiver unit 550 and receive traveling information of surrounding vehicles from the server 410 by requesting the traveling information from the server 410. The transmission and reception of traveling information can be performed periodically at time intervals of, for example, 100 ms.

Also, the controller 540 controls the GPS module 510 to interpret received navigation messages, collects various pieces of information such as a current position, a starting point, and a destination of my vehicle, and traveling information such as the speed, speed change, and traffic lane change of my vehicle based on the interpreted navigation message, stores the collected information in the memory 520, and transmits the stored information to the server 410 through the transmitter/receiver unit 550.

In addition, the controller 540 can collect various pieces of traveling information about my vehicle by integrally interpreting various pieces of information, which is input through a gyroscope, various sensors such as a speed sensor, various vehicle manipulating units such as a handle, direction indicator lights, and a brake, and so on, which are installed in my vehicle, and navigation messages input to the GPS module 510. Further, the controller 540 may convert image information received from the camera unit 530 into text data using, for example, a text recognition program, extract license numbers of surrounding vehicles from the converted text data, and request traveling information of a corresponding vehicle from the server 410. Accordingly, the server 410 can selectively transmit traveling information of a vehicle corresponding to the identifier to the controller 540 without an additional decision process on surrounding vehicles of my vehicle.

In addition, the controller 540 processes image information about surrounding vehicles, which has been captured by the camera unit 530, in particular, vehicles placed on the left-rear and right-rear sides of my vehicle and displays the processed image information on the display unit 560. In special instances, such as when traveling information is not received because there is no request for the traveling information or there is no change in a driving status of my vehicle even when traveling information is received, for example, when vehicles are driven at the same speed on the same traffic lane, traveling information may not displayed on the display unit 560.

Figure 11:
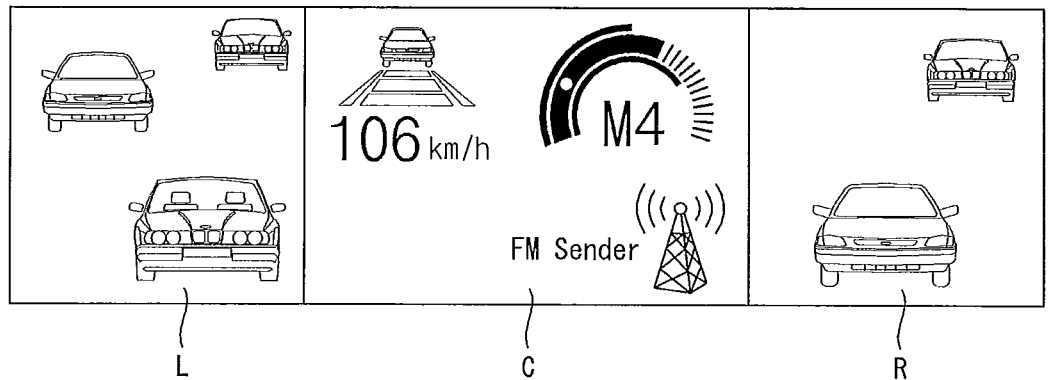
FIG. 11 is an example of a display screen including traveling information of vehicles according to an embodiment of the present invention.

Next, FIG. 11 is a diagram illustrating an example in which image information is displayed on the display unit 560. As shown, a screen of the display unit 560 can be trisected into different images in which image information about vehicles being driven on the left-rear side of my vehicle are displayed on a left area L and image information about vehicles being driven on the right-rear side of my vehicle are displayed on a right area R. In particular, when the camera unit 530 includes two or more cameras, image information received from a camera on the right or right-rear side can be displayed on the right area R, and image information received from a camera on the left or left-rear side can be displayed on the left area L.

Thus, according to an embodiment of the present invention, a driver can view vehicles, which are driven on the left/right and rear sides of my vehicle, through the display unit 560 installed on the front side of my vehicle such as a HUD even without viewing the rear mirror or the side mirrors of my vehicle. Further, traveling information about my vehicle or various pieces of information pertinent to an operation of the terminal 500, for example, the speed of my vehicle, reception information of radio broadcasting, and so on are displayed in a central area C. In addition, various pieces of information including nearby gas stations, an air conditioner status, etc., can be displayed in the central area C. Moreover, when a navigation function is executed, the controller 540 can output map data including the current position of my vehicle from the memory 520, search an optimal route up to a destination, process a video signal for indicating a selected route, and output the processed signal to the display unit 560.

In this instance, the display unit 560 can display map data read from the memory 520, for example, in graphical form according to navigation messages received from the GPS module 510, perform a graphic process on the current position of a vehicle, traveling route and traveling information of a vehicle and the like, and display the processed result on the displayed map under the control of the controller 540. In particular, the map data obtained as an execution result of the navigation function can be displayed in the central area C of the display unit 560. In this instance, various pieces of information such as traveling information displayed in the central area C can be displayed on one side of the central area C, for example, an upper left side or a lower right side, etc. transparently or opaquely in an upper layer of the map data image by controlling a color, etc.

For example, when a driver manipulates the direction indicator lights of my vehicle or a traveling direction of my vehicle has a set reference value or higher than a current road direction, for example, there is a difference in the angle of 20 degrees or more between the reference value and the current road direction, the controller 540 determines that there has occurred an event in which the vehicle has changed its traveling direction or its traffic lane and then evaluates traveling information of surrounding vehicles, which are being driven in corresponding directions, that is, in the left or right direction and on the read side.

Figure 12:
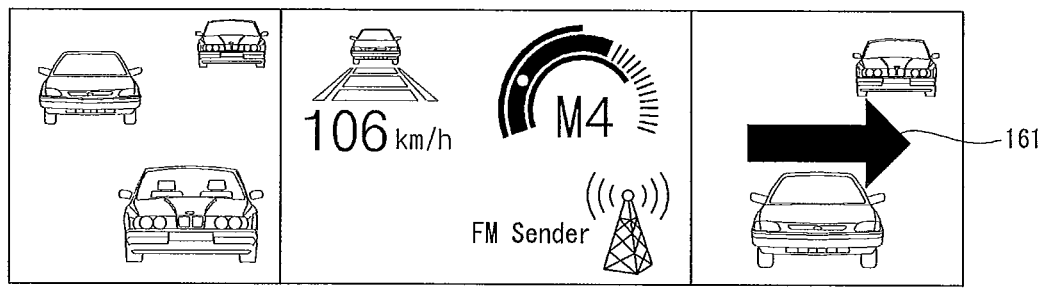
FIG. 12 is another example of a display screen including traveling information of vehicles according to an embodiment of the present invention.
Figure 13:
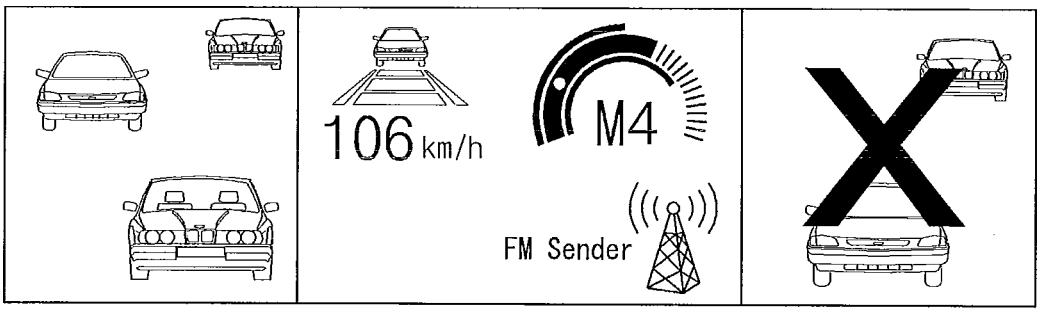
FIG. 13 is still another example of a display screen including traveling information of vehicles according to an embodiment of the present invention.

That is, the controller 540 can determine whether my vehicle can enter a corresponding direction by analyzing the position, speed, a change in the speed, etc. of vehicles, which are driven in the corresponding direction and in the rear of my vehicle. If, as a result of the determination, the controller 540 determines my vehicle can enter the corresponding direction, the controller 540 informs the driver of my vehicle that he or she can enter the corresponding direction by displaying, for example, a right arrow 161 in the right area R as shown in FIG. 12. In this instance, the display unit 560 can display the right arrow 161 transparently or opaquely in an upper layer of image information displayed in the right area R and can deliver information more clearly using a green color, flicker, etc. However, as a result of analyzing the traveling information of the vehicles being driven in the corresponding direction, for example, on the right-rear side, if it is determined that my vehicle cannot enter the corresponding direction, the controller 540 can warn the driver that my vehicle cannot enter the corresponding direction by marking, for example, 'X' in the right area R, as shown in FIG. 13.

In this instance, in order to transfer such information more clearly, the controller 540 may output an alarm and/or voice guidance through the sound output unit 170 other than the method of displaying the mark having a color such as red color, using a flicker method, etc. Accordingly, a driver can directly view image information of vehicles being driven on the left-rear side and on the right-rear side, which are displayed on the display unit 560, and also analyze traveling information of surrounding vehicles, which are received from the server 410. Accordingly, when events such as a change in the traffic lane occur, the driver can safely drive the vehicle.

Figure 14:
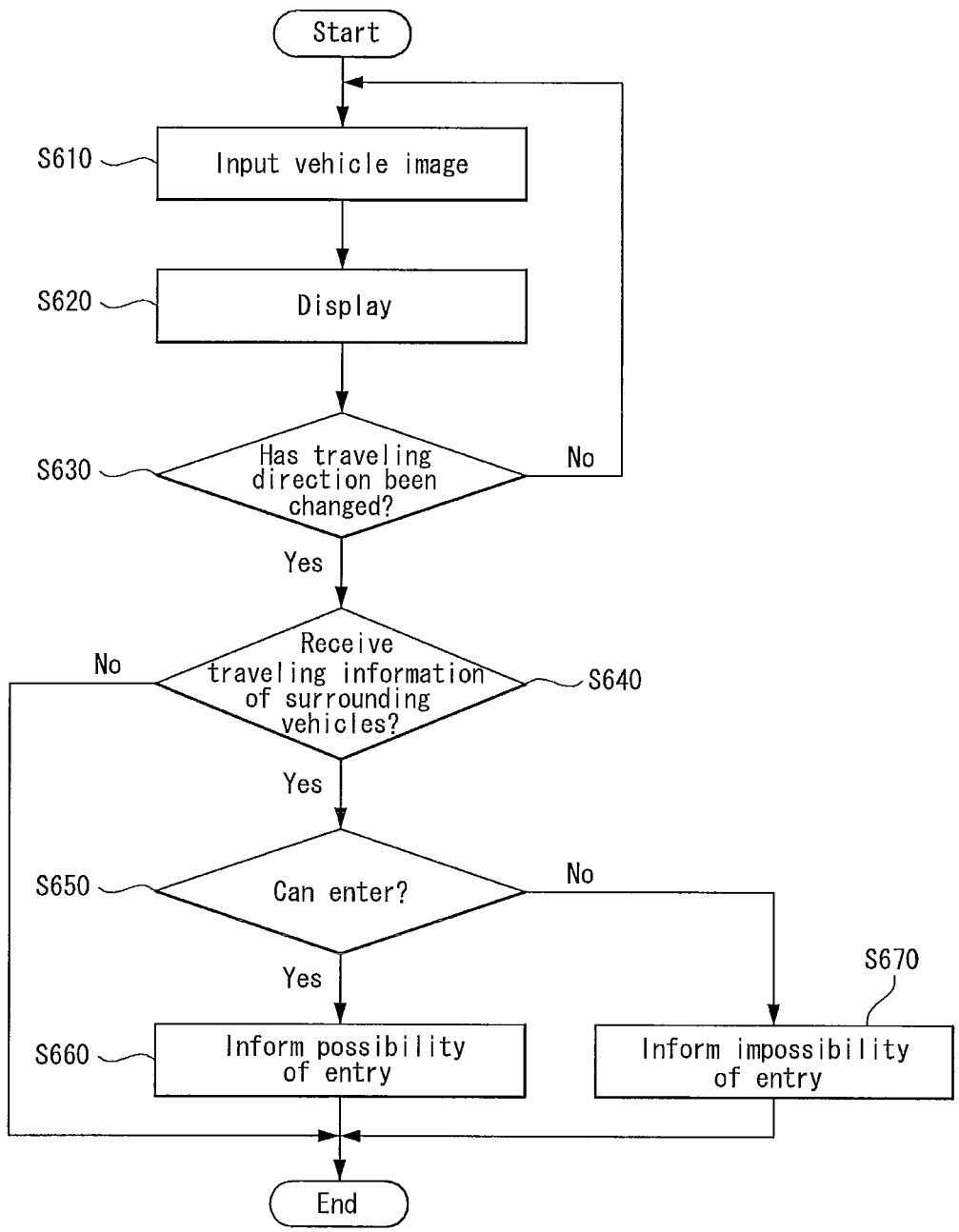
FIG. 14 is a flowchart showing a method of displaying traveling information of a vehicle according to an embodiment of the present invention.

Next, FIG. 14 is a flowchart illustrating a method of displaying traveling information according to another embodiment of the present invention. Referring to FIG. 14, the controller 540 receives driving image information of surrounding vehicles, which has been captured by the camera 530 (S610), processes the received driving image information, and displays the processed image information on the display unit 560 (S620). Next, the controller 540 determines whether an event occurs in which the traveling direction of my vehicle is changed when the steering wheel is manipulated or the direction indicator lights are turned on or off (S630). If, as a result of the determination, the traveling direction of my vehicle has changed (Yes in S630), the controller 540 determines whether traveling information of surrounding vehicles has been received from the server 410 (S640).

If, as a result of the determination in step S640, traveling information about surrounding vehicles has been received from the server 410 (Yes in S640), the controller 540 determines whether the traveling direction of my vehicle can be changed (e.g., for a change in the traffic lane, my vehicle can enter a traffic lane of a corresponding direction based on the traveling information) (S650). If, as a result of the determination in step S650, the traveling direction of my vehicle can change to the corresponding direction (Yes in S650), the controller 540 informs the driver of this fact through the display unit 560, the sound output unit 170 or the like (S660). However, if, as a result of the determination in step S650, the traveling direction of my vehicle cannot be changed (No in S650), the controller 540 informs the driver of this fact (S670).

Further, the transmitter/receiver discussed in the above embodiments can communicate with the other vehicles by directly communicating with a transceiver included the other vehicles, by communicating with a plurality of road side sensors, by communicating with a satellite system or by communicating with a traffic center communicating with both of the vehicle and the other vehicles.

As described above, traveling information about vehicles near a vehicle that is being driven is provided, and driving guidance information about safe driving of the vehicle that is being driven is provided, if appropriate. Accordingly, the vehicle can be safely driven. Further, various pieces of traveling information about surrounding vehicles being driven on the same road such as a position, a speed change, a traffic lane change, and a traveling route are provided. Accordingly, the needs of a user who wants to safely drive his or her car are provided by checking traveling information of other vehicles.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

What is claimed is:

1. A vehicle navigation apparatus, comprising:
a transceiver configured to communicate with at least one other vehicle near a vehicle including the vehicle navigation apparatus and configured to receive traveling information about the at least one other vehicle, the at least one other vehicle including a plurality of other vehicles;
a controller configured to calculate first movement change information of the vehicle and second movement change information of the at least one other vehicle and determine a degree of danger of the at least one other vehicle based on the received traveling information; and
a display unit configured to display a graphical representation of the vehicle and the at least one other vehicle based on the calculated movement change information,
wherein the controller is further configured to classify, according to the degree of danger of the plurality of other vehicles, the plurality of other vehicles to be one of a dangerous vehicle, a safe vehicle and a vehicle between the dangerous vehicle and the safe vehicle and to control the display unit to distinctively display the classified plurality of other vehicles.

2. The apparatus of claim 1, wherein the movement change information comprises at least one of a speed of the vehicle and the at least one other vehicle, a distance between the vehicle and the at least one other vehicle, a speed change of the vehicle and the at least one other vehicle, a driving route of the vehicle and the at least one other vehicle, and a driving prediction route of the vehicle and the at least one other vehicle.

3. The apparatus of claim 1, wherein the degree of danger is determined by comparing a predicted route of the at least one other vehicle and a predicted route of the vehicle according to a change in the first movement change information of the vehicle and the second movement change information of at least one other vehicle.

4. The apparatus of claim 1, further comprising:
a sound output unit configured to output an audio alarm signal indicating the determined degree of danger.

5. The apparatus of claim 1, wherein the controller is further configured to calculate danger avoidance information for avoiding the dangerous vehicle which has a determined degree of danger that is greater than a predetermined reference value.

6. The apparatus of claim 5, wherein the controller is further configured to calculate the danger avoidance information by comparing a predicted route of the dangerous vehicle and a predicted route of the vehicle and determining the degree of danger about a preset danger avoidance scenario based on the second movement change information of the dangerous vehicle and the first movement change information of the vehicle, and
wherein the controller is further configured to control the display unit to display the calculated danger avoidance information.

7. The apparatus of claim 1, wherein the transceiver is configured to communicate with the at least one other vehicle by directly communicating with a transceiver included in said at least one other vehicle, by communicating with a plurality of road side sensors, by communicating with a satellite system or by communicating with a traffic center communicating with both of the vehicle and said at least one other vehicle.

8. A method of controlling a vehicle navigation apparatus, the method comprising:
receiving, via a transceiver included in a vehicle having the vehicle navigation apparatus, traveling information about at least one other vehicle near the vehicle, the at least one other vehicle including a plurality of other vehicles;
calculating, via a controller, first movement change information of the vehicle and second movement change information of the at least one other vehicle based on the received traveling information;
determining, via the controller, a degree of danger of the at least one other vehicle based on the received traveling information; and
displaying, via a display unit, a graphical representation of the vehicle and the at least one other vehicle based on the calculated movement change information;
classifying, according to the degree of danger of the plurality of other vehicles, the plurality of other vehicles to be one of a dangerous vehicle, a safe vehicle and a vehicle between the dangerous vehicle and the safe vehicle; and
distinctively displaying the classified plurality of other vehicles.

9. The method of claim 8, wherein the movement change information comprises at least one of a speed of the vehicle and the at least one other vehicle, a distance between the vehicle and the at least one other vehicle, a speed change of the vehicle and the at least one other vehicle, a driving route of the vehicle and the at least one other vehicle, and a driving prediction route of the vehicle and the at least one other vehicle.

10. The method of claim 8, wherein the degree of danger is determined by comparing a predicted route of the at least one other vehicle and a predicted route of the vehicle according to a change in the first movement change information of the vehicle and the second movement change information of at least one other vehicle.

11. The method of claim 8, further comprising:
outputting an audio alarm signal indicating the determined degree of danger.

12. The method of claim 8, further comprising:
calculating danger avoidance information for avoiding the dangerous vehicle which has a determined degree of danger that is greater than a predetermined reference value.

13. The method of claim 12, wherein, the calculating step further comprises calculating the danger avoidance information by comparing a predicted route of the dangerous vehicle and a predicted route of the vehicle and determining the degree of danger about a preset danger avoidance scenario based on the second movement change information of the dangerous vehicle and the first movement change information of the vehicle, and
wherein the displaying step further comprises displaying the calculated danger avoidance information.

14. The method of claim 8, further comprising:
communicating with the at least one other vehicle by directly communicating with a transceiver included in said at least one other vehicle, by communicating with a plurality of road side sensors, by communicating with a satellite system or by communicating with a traffic center communicating with both of the vehicle and said at least one other vehicle.

15. The apparatus of claim 1, wherein the controller is further configured to determine a number of the plurality of other vehicles to communicate with based on a predetermined criterion using traveling information received from the at least one other vehicle.

16. The method of claim 8, further comprising:
determining a number of the plurality of other vehicles to communicate with based on a predetermined criterion using traveling information received from the at least one other vehicle.

* * * * *